US009259856B2

(12) United States Patent
Oda et al.

(10) Patent No.: US 9,259,856 B2
(45) Date of Patent: Feb. 16, 2016

(54) METHODS FOR CONTROLLING THE MIXING PROCESS OF PROCESSING RUBBER

(75) Inventors: Takumi Oda, Osaka (JP); Hideki Shima, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 946 days.

(21) Appl. No.: 13/461,350

(22) Filed: May 1, 2012

(65) Prior Publication Data
US 2013/0018141 A1  Jan. 17, 2013

(30) Foreign Application Priority Data

Jul. 12, 2011 (JP) .................................. 2011-154066
Jul. 12, 2011 (JP) .................................. 2011-154068
Jul. 12, 2011 (JP) .................................. 2011-154071

(51) Int. Cl.
*B29B 7/18* (2006.01)
*B29B 7/28* (2006.01)
(Continued)

(52) U.S. Cl.
CPC ... *B29B 7/18* (2013.01); *B29B 7/28* (2013.01); *B29B 7/72* (2013.01); *B29B 7/88* (2013.01); *C08J 3/247* (2013.01); *C08J 2307/00* (2013.01); *C08J 2309/06* (2013.01); *C08L 15/00* (2013.01)

(58) Field of Classification Search
CPC .............. B29B 7/72; B29B 7/18; B29B 7/28; B29B 7/88
USPC ................ 366/142, 189, 192, 194–196, 76.1, 366/76.2, 76.7, 76.8, 76.93, 77; 425/204, 425/208, 209
See application file for complete search history.

(56) References Cited

U.S. PATENT DOCUMENTS 3,447,201 A * 6/1969 Seanor et al. ................ 366/76.2
4,455,091 A * 6/1984 Bamberger et al. .......... 366/76.7
(Continued)

FOREIGN PATENT DOCUMENTS

CN  87210386 U  10/1988
CN  101941316 A  1/2011
(Continued)

OTHER PUBLICATIONS

Japanese Office Action issued in Japanese Patent Application No. 2011-154066, mailing date Aug. 2, 2011, with English translation.
(Continued)

*Primary Examiner* — Charles Cooley
(74) *Attorney, Agent, or Firm* — Westerman, Hattori, Daniels & Adrian, LLP

(57) ABSTRACT

The present invention provides an apparatus for processing a rubber. The apparatus is equipped with an enclosed kneading chamber; a charging port for charging a material into the kneading chamber; a stirring rotor for stirring the material in the kneading chamber; a control section for automatically controlling the rotational speed of the stirring rotor; and a temperature sensor for detecting an interior temperature of the kneading chamber and outputting the detected information regarding the interior temperature to the control section. The control section automatically controls the rotational speed by a PID control configured to attempt to match the actual temperature with the target temperature until expiration of a control time being set in a state where the material containing a rubber component exists in the kneading chamber, based on the information regarding the actual temperature and information regarding a target temperature being set.

10 Claims, 5 Drawing Sheets

(51) Int. Cl.
*B29B 7/72* (2006.01)
*B29B 7/88* (2006.01)
*C08J 3/24* (2006.01)
*C08L 15/00* (2006.01)

(56) References Cited

U.S. PATENT DOCUMENTS

| | | | | |
|---|---|---|---|---|
| 4,804,505 | A | | 2/1989 | Venzke |
| 4,818,113 | A | * | 4/1989 | Patel ............................ 366/76.2 |
| 4,830,506 | A | * | 5/1989 | Borzenski .................... 366/76.2 |
| 4,953,984 | A | * | 9/1990 | Miyoshi ....................... 366/76.2 |
| 5,324,107 | A | * | 6/1994 | Tanaka et al. ................ 366/76.3 |
| 5,529,390 | A | * | 6/1996 | Giani et al. .................. 366/76.6 |
| 5,792,805 | A | | 8/1998 | Williams |
| 5,865,535 | A | * | 2/1999 | Edwards ....................... 366/76.7 |
| 5,891,938 | A | | 4/1999 | Williams |
| 6,817,748 | B2 | * | 11/2004 | Campanelli et al. .......... 366/76.2 |
| 7,314,305 | B2 | * | 1/2008 | Proni et al. ..................... 366/145 |
| 8,047,701 | B2 | * | 11/2011 | Naoi ............................... 366/76.7 |
| 8,911,139 | B2 | * | 12/2014 | Naoi et al. ..................... 366/76.7 |
| 2002/0016403 | A1 | | 2/2002 | Pontecorvo |
| 2002/0068774 | A1 | | 6/2002 | Hotellier et al. |
| 2002/0193465 | A1 | | 12/2002 | Proni et al. |
| 2004/0085851 | A1 | * | 5/2004 | Campanelli et al. ......... 366/76.7 |
| 2004/0096385 | A1 | * | 5/2004 | Proni et al. ..................... 423/335 |
| 2004/0213075 | A1 | * | 10/2004 | Proni et al. .................... 366/76.7 |
| 2007/0025176 | A1 | * | 2/2007 | Naoi ............................... 366/76.7 |
| 2011/0267919 | A1 | * | 11/2011 | Naoi et al. ...................... 366/142 |
| 2013/0018141 | A1 | * | 1/2013 | Oda et al. ........................ 524/526 |
| 2014/0016428 | A1 | * | 1/2014 | Akai et al. .................... 366/76.2 |
| 2015/0036449 | A1 | * | 2/2015 | Ozawa et al. ...................... 366/69 |

FOREIGN PATENT DOCUMENTS

| | | | |
|---|---|---|---|
| CN | 102107466 | A | 6/2011 |
| DE | 30 35 353 | A1 | 5/1982 |
| DE | 36 23 679 | A1 | 1/1988 |
| DE | 696 04 395 | T2 | 5/2000 |
| DE | 600 04 977 | T2 | 7/2004 |
| DE | 601 02 643 | T2 | 4/2005 |
| JP | 7-227845 | A | 8/1995 |
| JP | 10-286824 | A | 10/1998 |
| JP | 2000-280236 | A | 10/2000 |
| JP | 2002-046123 | A | 2/2002 |
| JP | 2002-356583 | A | 12/2002 |
| JP | 2004-352831 | A | 12/2004 |
| JP | 2005-047094 | A | 2/2005 |
| JP | 2007-008112 | A | 1/2007 |
| JP | 2007054824 | A | * 3/2007 |
| JP | 2007-320184 | A | 12/2007 |
| JP | 2008-019401 | A | 1/2008 |
| JP | 2010-182263 | A | 8/2010 |

OTHER PUBLICATIONS

Office Action dated Feb. 10, 2015, issued in corresponding Japanese application No. 2011-154071, with English translation. (4 pages).
Office Action dated Feb. 10, 2015, issued in corresponding Japanese application No. 2011-154068, with English translation. (6 pages).
Chinese Office Action dated Apr. 30, 2014, issued in corresponding Chinese Patent Application No. 201210233997.6 with English translation (16 pages).
German Office Action dated Jul. 4, 2013, issued in corresponding German application No. 102012105855.5, w/ English translation.
Chinese Office Action dated Jan. 12, 2015, issued in corresponding CN Patent Application No. 201210233997.6 with English translation (20 pages).
Office Action dated Jul. 31, 2015, issued in counterpart German Patent Application No. 102012105855.5, with English translation (8 pages).

* cited by examiner

Enlarged view of temperature (portion A)

METHODS FOR CONTROLLING THE MIXING PROCESS OF PROCESSING RUBBER

BACKGROUND OF THE INVENTION

1. Field of the Invention

The present invention relates to an apparatus for processing a rubber and a processing method therefor.

2. Description of the Related Art

In general, a rubber is processed in the order of mixing, rolling/extruding and forming. Among these, the mixing step includes mastication step and kneading step. The kneading step is conducted for the purpose of mixing and dispersing compounding agents in raw rubber finely and homogenously. On the other hand, the mastication step is conducted prior to the kneading step for softening and homogenizing the rubber itself such that the compounding agents can easily be mixed and dispersed in the raw rubber in the subsequent kneading step.

The kneading step is generally separated into two steps, namely A-kneading and B-kneading. A-kneading is a step of adding an agent and kneading the mixture, in which the agent contains a reinforcing agent such as silica and carbon black, but excludes vulcanization components (e.g., vulcanizing agent and vulcanization accelerator). B-kneading is a step of adding vulcanization components to the material obtained by the A-kneading step and then kneading the mixture.

For any step of the mastication, A-kneading and B-kneading, temperature control plays a critical role. (References are made to, for example, Japanese Unexamined Patent Publication (Kokai) Hei 7-227845, Japanese Unexamined Patent Publication (Kokai) No. 2004-352831, Japanese Unexamined Patent Publication (Kokai) No. 2007-8112 and Japanese Unexamined Patent Publication (Kokai) No. 2007-320184).

(1) First, a description is made on the mastication step. Mastication serves for exerting shear force on a rubber material to cut its molecular chains, to reduce its viscosity and to impart plasticity to the material for forming. There are two types of mastication, i.e., low temperature mastication and high temperature mastication. As described in Japanese Unexamined Patent Publication (Kokai) Hei 7-227845, a peptizer (i.e., a mastication promoter) has conventionally been added during the kneading of the high temperature mastication.

Low temperature mastication is mechanical mastication conducted at a temperature up to about 110° C. In this mastication step, the longer portions of molecular chains are selectively cut to decrease the molecular weight. On the other hand, high temperature mastication is chemical mastication conducted at a higher temperature, for example, from 120° C. to 180° C., with an addition of a peptizer to cause a chemical reaction and thus to cut the molecular chains.

The mastication of natural rubber is conducted in an enclosed-type mixer (e.g., a Banbury mixer). Heat is generated as the kneading of the rubber proceeds, increasing the temperature of the rubber. Particularly as in the case of high temperature mastication, holding the rubber at a high temperature, for example, from 150° C. to 180° C., within an enclosed space for an extended period of time may cause the rubber to burn (or to scorch). Therefore, a general practice is to add a peptizer to impart plasticity to the raw rubber at an early step and thus to shorten the mastication time.

In the case of the high temperature mastication using a peptizer, a molecular chain is cut, regardless of its molecular weight, at a reaction point of the peptizer. As a result, various compounds with small to large molecular weights are considered remain in the rubber composition after the mastication. This may lead to segregation of the peptizer and may further increase the non-uniformity of the reaction.

On the other hand, as described above, mechanical mastication conducted at a low temperature selectively cuts the portions with larger molecular weights, which evenly reduces the weights of molecules in the rubber compound. Therefore, mechanical mastication is more advantageous in stabilizing the chemical properties of the rubber after the mastication.

From the above point of view, the mastication step is preferably conducted solely as mechanical mastication. In a conventional method, an attempt to solely conduct mechanical mastication faces a problem that the heat, associated with the kneading of rubber, increases the temperature of the rubber. In other words, the temperature rises with the progress of the mastication and exceeds the temperature range suitable for the mechanical mastication with imparting sufficient plasticity to the rubber, causing the rubber to scorch. With this background, there is a need for a technique that enables mastication while maintaining a most suitable temperature.

(2) Next, a description is made on A-kneading. In recent years, silica has been used instead of carbon black as a reinforcing agent to be added during the A-kneading step. Silica, however, has a drawback that its ability to reinforce rubber is smaller than that of carbon black. Therefore, when mixing silica into a rubber component, a silane coupling agent is added to increase the reinforcing ability. When added as a compounding agent, the silane coupling agent is fixed on the silica by its coupling reaction and, furthermore, reacts with the rubber component, increasing the dispersibility of the silica in the rubber and improving the reinforcing ability.

It has been known that, in order to make the silica react with the silane coupling agent efficiently, the kneading is desirably conducted at a specific temperature for an extended period of time. Under a low temperature environment, a coupling reaction is less likely to occur between the silica and a silane coupling agent. On the other hand, an excessively high temperature causes the rubber to cross-link, which rapidly increases the viscosity and causes a gel to be formed.

When a rubber component is kneaded with silica and a silane coupling agent in a mixer, the interior temperature of the mixer rises due to the heat generated by the viscous flow of the rubber and the heat associated with the coupling reaction. As a result, the temperature reaches a level at which a gel is formed within a short period of time, and thus causing a problem that not enough time is allowed for the coupling reaction.

Japanese Unexamined Patent Publication (Kokai) No. 2004-352831 discloses a method in which kneading step before the addition of silane coupling agent is conducted using an enclosed-type Banbury mixer, while the coupling reaction after the addition of the silane coupling agent is conducted using a separate mixer that is not enclosed. Also, Japanese Unexamined Patent Publication (Kokai) No. 2007-8112 discloses a method in which a rubber composition that has been kneaded is transferred onto a pair of kneading rolls at a temperature slightly below the temperature range suitable for the coupling reaction, wherein the shear force exerted by the rolls causes the self-generation of heat for the coupling reaction.

However, the methods of Japanese Unexamined Patent Publication (Kokai) No. 2004-352831 and Japanese Unexamined Patent Publication (Kokai) No. 2007-8112 require mixers and rolls dedicated to coupling reactions. These Documents do not disclose a technique for kneading within a suitable temperature range without increasing the installation space.

(3) Next, a description is made on B-kneading. As described in Japanese Unexamined Patent Publication (Kokai) No. 2007-320184, B-kneading step is generally conducted at a temperature lower than the temperature at which A-kneading step is conducted. The following is the reason. During the B-kneading step, vulcanization components are added as additives. Therefore, when the material is kept under a high temperature, the material temperature may become excessively high during the kneading, which may cause the rubber composition, still insufficiently kneaded, to cross-link. Once such a phenomenon occurs, the hardness of the rubber increases and the formability deteriorates. Furthermore, in the case where insoluble sulfur is used as a vulcanization ingredient, the sulfur may be transformed into soluble at a high temperature, resulting in the formation of a bloom which causes adhesive failure.

When rubber components are kneaded in a mixer, the interior temperature of the mixer rises due, for example, to the heat generated by viscous flow of the rubber. Especially when the kneading is conducted with vulcanization components added, crosslinking occurs as soon as the temperature reaches about 120° C. Therefore, in a conventional practice, the content is discharged from the mixer as soon as this temperature is reached. In this case, however, the vulcanizing agents may not be kneaded for a sufficient period of time, causing the vulcanizing agents to be poorly dispersed. A rubber composition having vulcanizing agents poorly dispersed is later formed into a product containing foreign matters consisting of vulcanization accelerators such as a guanidine compound. In addition, the finished product may have a problem of multiple failures, such as non-uniform surface color and generation of internal pores, which increase the rejection rate.

Japanese Unexamined Patent Publication (Kokai) No. 2007-320184 discloses a construction having a cooling apparatus for lowering the internal temperature of a mixer. Such a cooling apparatus not only increases the installation space, but also increases the production cost significantly. Furthermore, the interior temperature of the mixer is largely affected by the performance and functions of the cooling apparatus and may not necessarily be maintained in a desirable condition at all times.

SUMMARY OF THE INVENTION

Taking account of the above problems, an object of the present invention is to provide an apparatus for processing a rubber, capable of maintaining a temperature in a range desirable for each step during rubber processing, and a processing method therefor.

In order to achieve the above object, the apparatus for processing a rubber according to the present invention includes:

an enclosed kneading chamber;

a charging port for charging a material into the kneading chamber;

a stirring rotor for stirring the material in the kneading chamber;

a control section for automatically controlling a rotational speed of the stirring rotor; and a temperature sensor for detecting a temperature in the kneading chamber and outputting the detected information regarding an actual temperature to the control section;

wherein the control section automatically controls the rotational speed by a PID control configured to attempt to match the actual temperature with the target temperature until expiration of a control time being set in a state where the material containing a rubber component exists in the kneading chamber, based on the information regarding the actual temperature and information regarding a target temperature being set.

More specifically, the control section may be configured to automatically control the rotational speed of the motor which rotationally drives the stirring rotor.

The material may be a natural rubber or a rubber mixture containing 50% or more of a natural rubber. In such a case, the target temperature may be set to a temperature that is lower than a lower limit temperature at and above which the natural rubber is scorched, whereby the present apparatus conducts mastication within a suitable temperature range for an extended period of time.

In addition, the material may contain a rubber component, silica and a silane coupling agent. In such a case, the target temperature may be set to a temperature lower than a lower limit temperature at which the rubber component undergoes gelation, and higher than a lower limit temperature at which a coupling reaction of silica with a silane coupling agent, whereby the present apparatus conducts kneading within a temperature range suitable for the coupling reaction for an extended period of time.

Furthermore, the material may contain a rubber component and a vulcanizing agent. In such a case, the target temperature may be preferably set to a temperature of lower than 120° C., and more preferably 110° C. or lower, or to a temperature lower than a lower limit temperature at which the rubber component initiates cross-linking, whereby the present apparatus improves the dispersion of the vulcanizing agent while preventing the progress of cross-linking.

According to the present invention, a control section is provided to perform an automatic PID control for the rotational speed of the stirring rotor, which enables the temperature inside the kneading chamber to be maintained within a range for a predetermined period of time. This permits stirring and kneading to be performed in the kneading chamber for a predetermined period of time while maintaining a desirable temperature. In other words, the temperature is maintained within a temperature range suitable for each step of an extended period of time, enabling the production of rubber with excellent properties, compared with a conventional approach in which a rubber material is discharged as soon as a predetermined temperature is reached.

DETAILED DESCRIPTION OF THE INVENTION

<Apparatus Construction>

Figure 1:
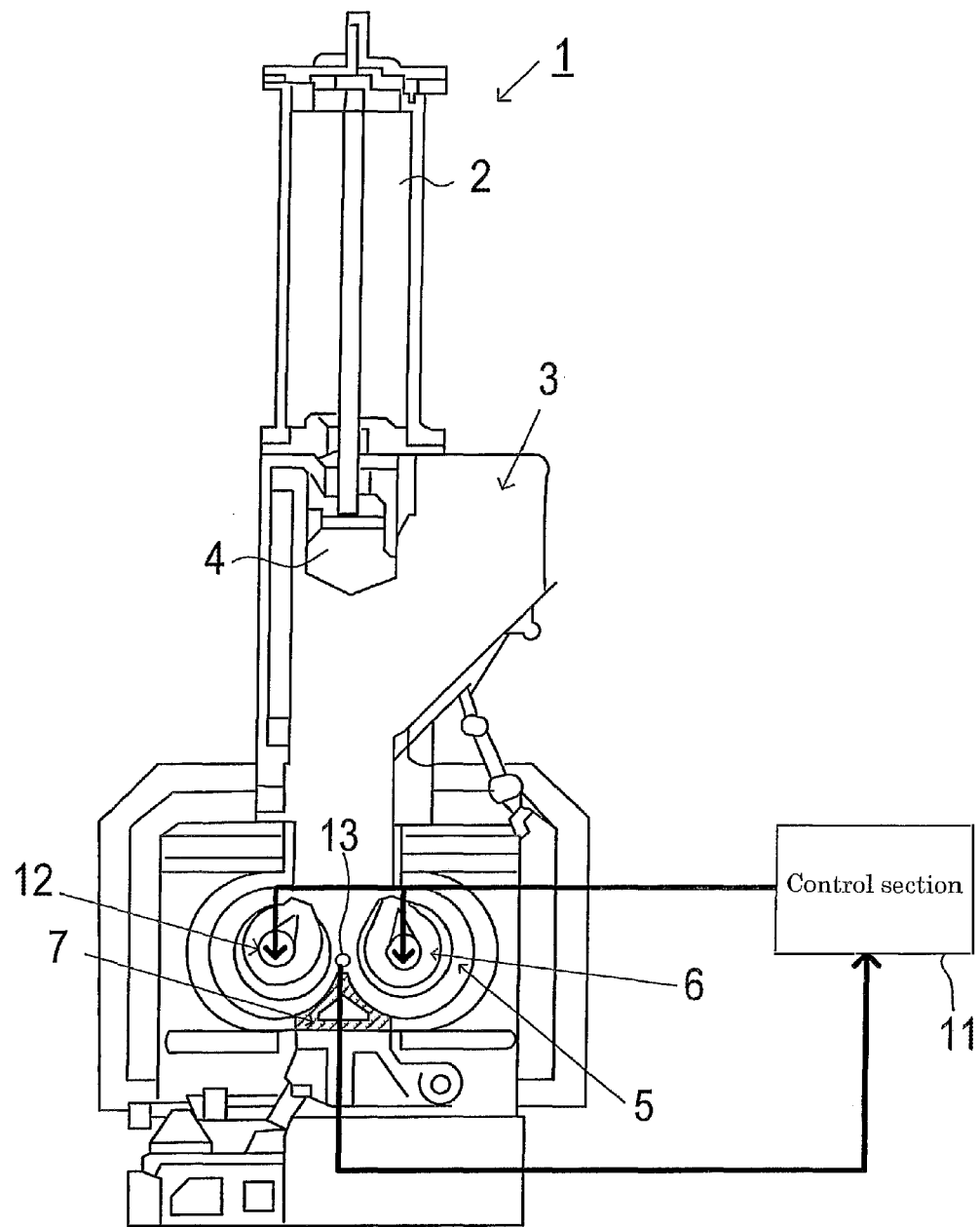
FIG. 1 is a schematic structural drawing of an apparatus for processing a rubber according to the present invention.

FIG. 1 is a schematic illustration of a rubber processing apparatus 1 according to the present invention. The present apparatus 1 is an enclosed-type mixer including a cylinder 2 for moving a ram 4 up and down, a charging port 3 for charging materials to be processed, a kneading chamber 5 for kneading the materials, and a drop door 7 for discharging the kneaded rubber. The ram 4 is adapted for adjusting the pressure inside the kneading chamber 5 by its up-and-down motions.

The kneading chamber 5 is equipped with a pair of stirring rotors 6 for stirring materials, and each rotor is rotationally driven around a rotation axis 12 by a motor (not shown). The kneading chamber 5 is also provided with a temperature sensor 13 for detecting the temperature inside the chamber. The temperature sensor 13 may be disposed, for example, on the inner side of the drop door 7.

The motor for rotating the stirring rotor 6 is controlled of its rotational speed according to a control signal from a control section 11. The control section 11 controls the rotational speed of the motor based on information, sent from the temperature sensor 13, regarding the interior temperature of the kneading chamber 5. The motor may be of any type that is adapted for freely changing its rotational speed according to the control section 11 and may, for example, be an inverter motor.

More specifically, the rotational speed of the motor is subject to a PID control involving a PID arithmetic processing unit in the control section 11, in which the control is based on the computations of proportional (P), integral (I), and differential (D) terms calculated from the deviation of an actual temperature "Tp" from a target temperature "Ts" wherein the actual temperature is measured inside the kneading chamber 5 by the temperature sensor 13. In other words, the PID arithmetic processing unit determines the rotational speed of the motor based on the summation of control variables determined by three actions; i.e., a proportional (P) action which yields a control variable in proportion to the difference (deviation "e") between an actual temperature "Tp" and a target temperature "Ts" in which the actual temperature is measured inside the kneading chamber 5 by the temperature sensor 13; an integral (I) action which yields a control variable by integrating the deviation "e" along the time axis; and a differential (D) action which yields a control variable from the slope or the differential value, of the change in the deviation "e".

<Mastication>

Figure 2:
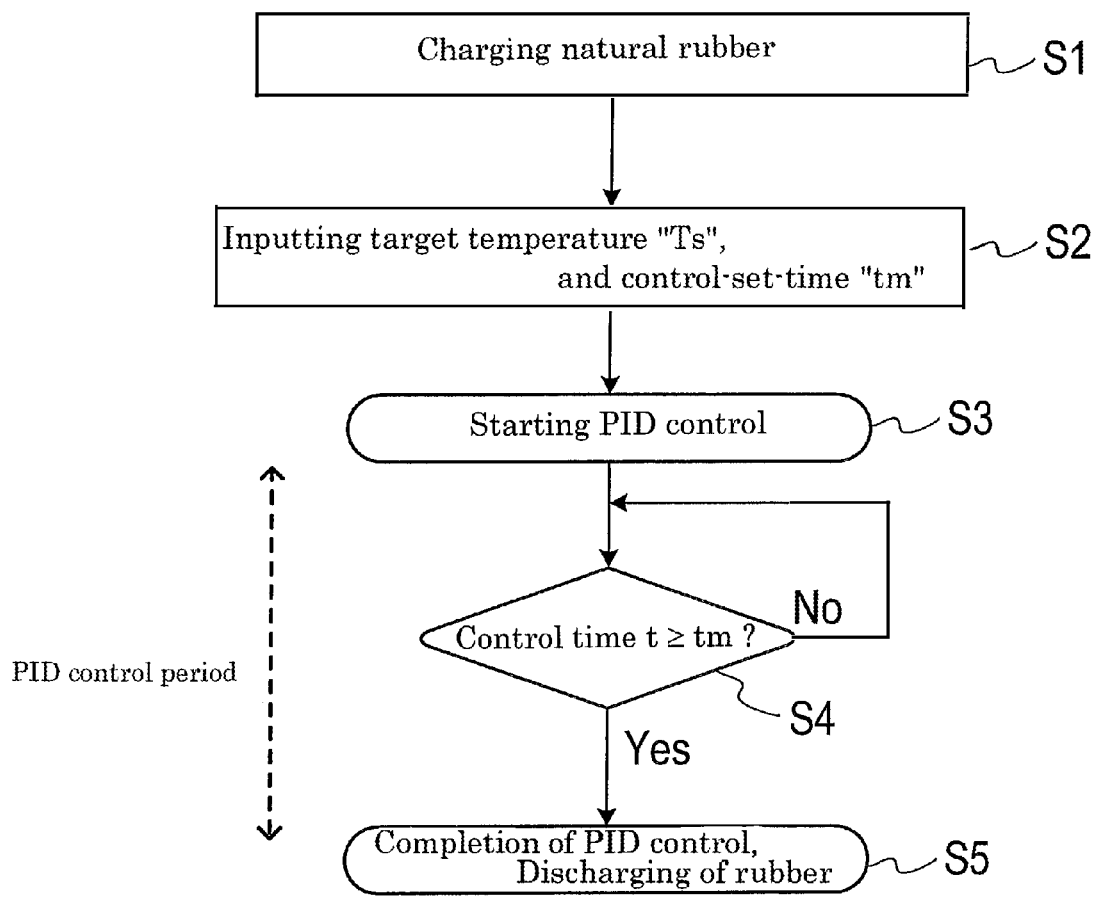
FIG. 2 is a flow chart showing the flow of a mastication method conducted in the present apparatus.

FIG. 2 is a flow chart depicting the flow of the rubber processing method (mastication method) conducted in the present apparatus 1. A natural rubber to be masticated is charged into the apparatus 1 (step S1); values are inputted for the target temperature "Ts" and control-set-time "tm" (step S2); and the control section 11 starts the PID control for the motor based on these values (step S3). In other words, a control signal from the control section 11 determines the rotational speed of the motor and thus determines the rotational speed (i.e., stirring speed) of the stirring rotor 6. Information regarding the target temperature "Ts" and control-set-time "tm" may be provided to the control section 11 in advance before the step S1.

The control section 11 continues to control the rotational speed of the motor by the PID control until the control time "t" elapsed from the start of the control, reaches or exceeds the control-set-time "tm" ("No" in the S4). As described previously, the specific control involves changing the rotational speed by a small amount based on the deviation of an actual temperature "Tp" from a target temperature "Ts", the integral value of the deviation and the differential value of the deviation, in which the actual temperature is measured in the kneading chamber 5 by the temperature sensor 13.

The value of the target temperature "Ts" set in the step S2 may preferably be slightly lower than the upper limit temperature, at and below which the rubber is not scorched even without a peptizer. The reason is that, even though the control section 11 is configured for a PID control, the actual temperature may exceed the target temperature "Ts" slightly and temporarily during the control process. In other words, the target temperature "Ts" may preferably be set to a value such that the actual temperature "Tp" in the kneading chamber 5 is allowed to slightly exceed the target temperature "Ts" temporarily during the control process.

When the control time "t" reaches or exceeds the control-set-time "tm" ("Yes" in the step S4), the control section 11 completes the PID control of the motor and the masticated rubber is discharged from the drop door 7 (step S5). The control-set-time "tm" shall be longer than the time "tc" required for imparting sufficient plasticity to the rubber.

Figure 3:
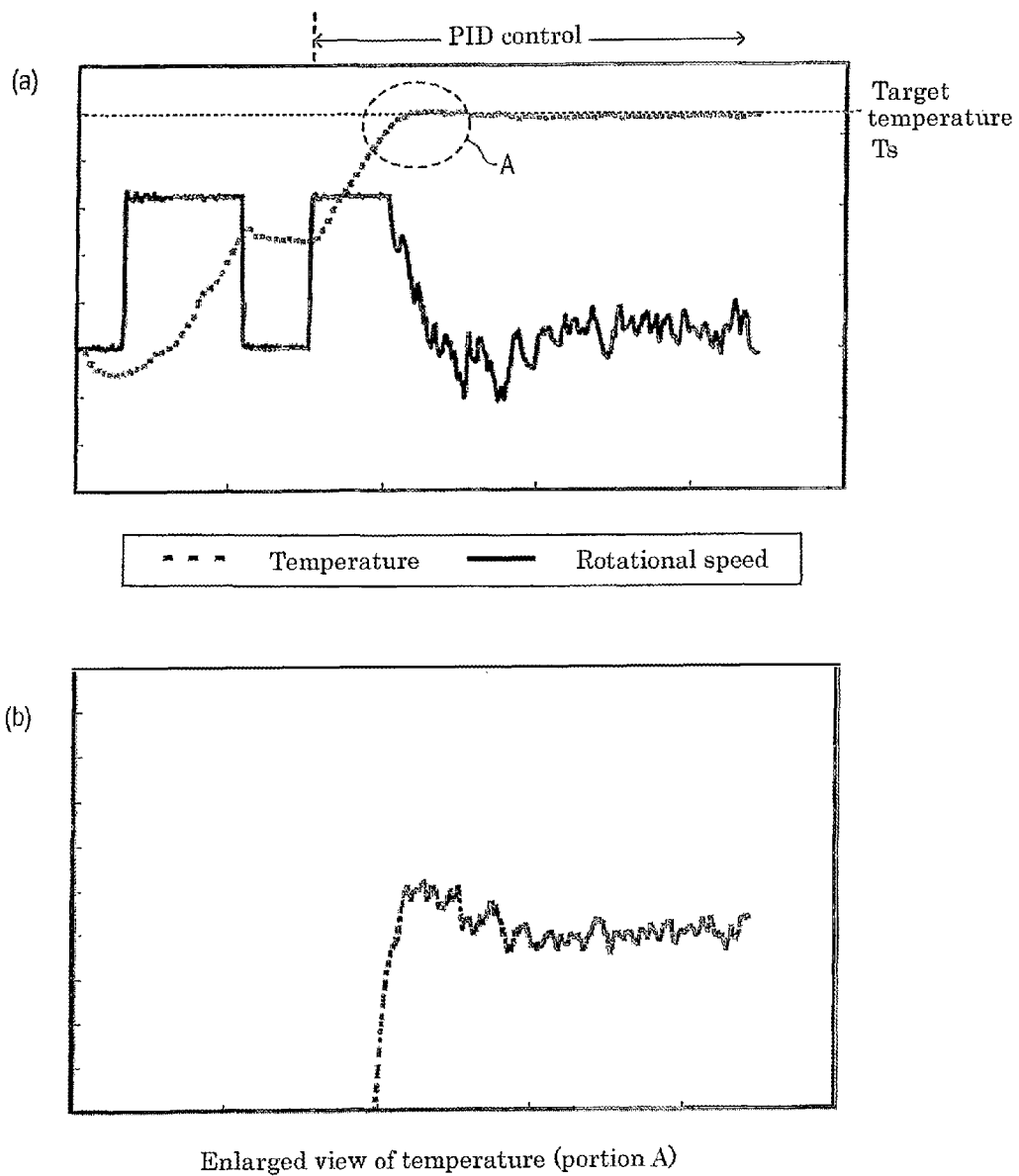
FIGS. 3(a) and 3(b) are graphs each showing the change with time of the temperature actually measured inside the kneading chamber and the change with time of the revolution of the motor, in which the temperature and revolution are PID controlled by the control section of the present apparatus.

FIG. 3(*a*) is a graph showing the changes in the actual temperature "Tp" in the kneading chamber 5 and in the revolution number of the motor under the PID control of the control section 11 inside the present apparatus 1. FIG. 3(*b*) is an enlarged view of the portion A in FIG. 3(*a*).

As shown in FIG. 3, the rotational speed of the motor is changed by a small amount (upwardly or downwardly), allowing the actual temperature "Tp" in the kneading chamber 5 to be maintained almost equal to the target temperature "Ts" over an extended period of time. Maintaining the temperature in this range over a predetermined period of time enables sufficient plasticity to be imparted in the masticated rubber. In Example shown in FIG. 3, the target temperature "Ts" was set to be 90° C., and the PID control enabled the actual temperature "Tp" to be maintained within a range from 85° C. to 98° C.

In the flow chart shown in FIG. 2, the control section 11 is configured to execute a PID control every time a batch of natural rubber is charged. It should be noted that, in real practice, the control section may be configured such that a user can choose whether or not to use the PID control.

The present apparatus allows the interior temperature of the kneading chamber 5 to be maintained over a predetermined period of time, enabling the production of masticated rubber with sufficiently high plasticity solely by mechanical mastication. Since this eliminates the need for the chemical mastication using a peptizer, the chemical amount of masticated rubber becomes almost fully homogenized, and thus stabilizing the chemical properties of the masticated rubber product. The following Examples provide detailed explanations on more specifics of the effects.

<A-kneading>

Figure 4:
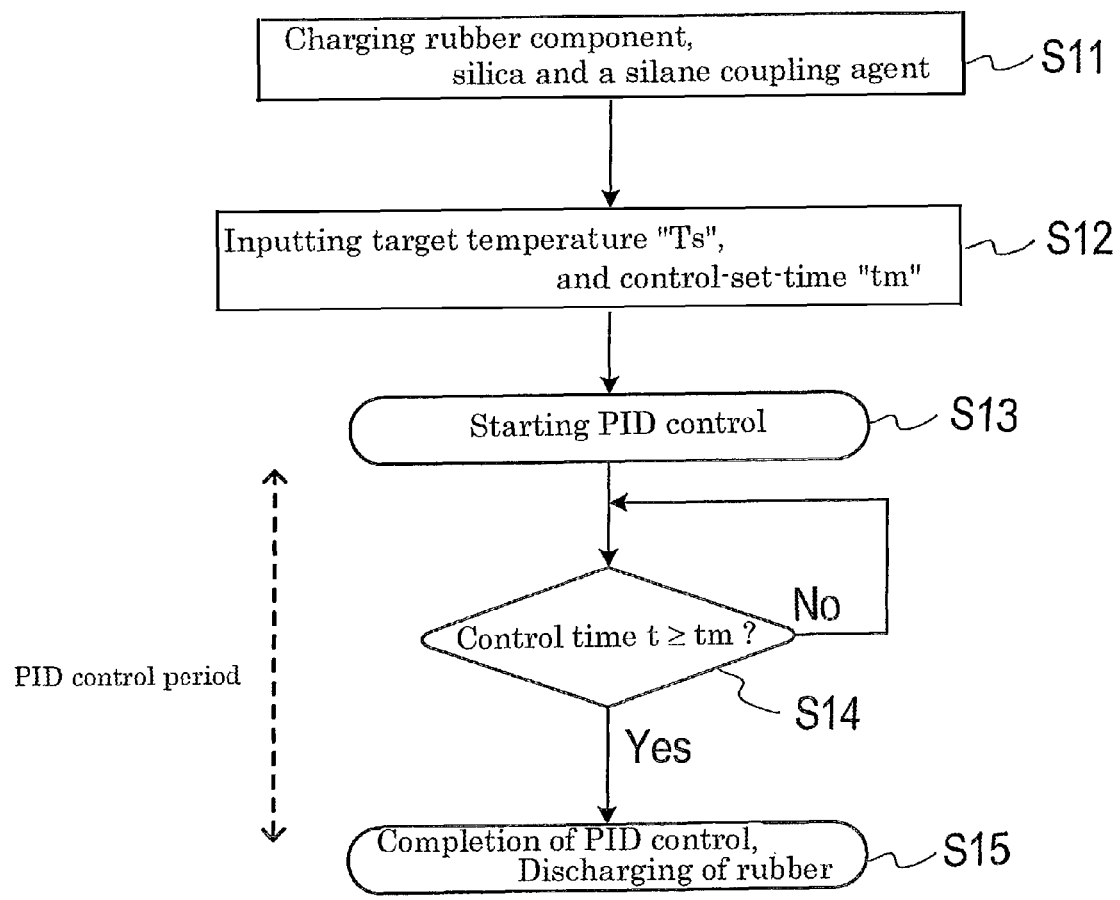
FIG. 4 is a flow chart showing a flow of the method for A-kneading conducted in the present apparatus.

Now, A-kneading is explained. FIG. 4 is a flow chart depicting the flow of a rubber processing method (A-kneading method) conducted in the present apparatus 1. A rubber component, silica and a silane coupling agent are charged into the apparatus 1 (step S11); values are inputted for the target temperature "Ts" and for the control-set-time "tm" (step S12); and the control section 11 starts a PID control of the motor based on these values (step S13). In other words, a control signal from the control section 11 determines the rotational speed of the motor and thus determines the rotational speed (i.e., stirring speed) of the stirring rotor 6. Information regarding the target temperature "Ts" and control-set-time "tm" may be provided to the control section 11 in advance before the step S11.

It should be noted that, during the step S11, the rubber component, silica and a silane coupling agent may be charged separately into the apparatus 1 or the rubber component and silica may be charged first for a predetermined stirring process before the silane coupling agent is charged.

The control section 11 continues to control the rotational speed of the motor by the PID control until the control time "t" elapsed from the start of the control, reaches or exceeds the control-set-time "tm" ("No" in the step S14). As described previously, the specific control involves changing the rotational speed by a small amount based on the deviation of an actual temperature "Tp" from a target temperature "Ts", the integral value of the deviation and the differential value of the deviation, in which the actual temperature is measured in the kneading chamber 5 by the temperature sensor 13.

The target temperature "Ts" set in the step S12 may preferably be slightly lower than a lower limit temperature at and above which the rubber component undergoes gelation. The reason is that, even though the control section 11 is configured for a PID control, the actual temperature may exceed the target temperature "Ts" slightly and temporarily during the control process. In other words, the target temperature "Ts" may preferably be set such that the actual temperature "Tp" in the kneading chamber 5, is allowed to exceed the target temperature "Ts" slightly and temporarily during the control process. The target temperature "Ts" shall be higher than a lower limit temperature at and above which a coupling reaction occurs between the silica and a silane coupling agent.

When the control time "t" reaches or exceeds the control-set-time "tm" ("Yes" in the step S14), the control section 11 completes the PID control of the motor and the rubber mix composition is discharged from the drop door 7 (step S15).

The control-set-time "tm" set at the step S12 shall be longer than the time "tc" required for a sufficient coupling reaction to occur between silica and the silane coupling agents. More specifically, contemplating a time "ti" elapsed after the start of the control until the actual temperature "Tp" reaches a temperature range suitable for coupling reaction, the control-set-time "tm" may preferably be equal to or longer than the sum of the times "tc" and "ti".

It has been shown that, when A-kneading is conducted according to the flow chart depicted in FIG. 4, the rotational speed of the motor is changed by a small amount (upwardly or downwardly) as shown in FIG. 3, allowing the actual temperature "Tp" in the kneading chamber 5 to be maintained almost equal to the target temperature "Ts" over an extended period of time. Maintaining the temperature longer than the aforementioned time "ti" permits a sufficient coupling reaction of the silane coupling agent in the kneading chamber 5. From a graph as shown in FIG. 3, it was confirmed that the PID control enabled the actual temperature "Tp" to be maintained within a range from 150° C. to 158° C. for the target temperature "Ts" of 155° C.

In the flow chart shown in FIG. 4, the control section 11 is configured to execute a PID control every time after the silane coupling agent is charged. In practice, the control section may be configured such that a user can choose whether or not to use the PID control.

A rubber component to be charged includes a terminal-modified diene rubber having a number average molecular weight within a range from 150,000 to 400,000 before the modification. Examples of the diene rubber to be terminal-modified may include, but not limited to, a butadiene rubber (BR: e.g.; high-cis BR with cis-1,4 of 90% or more; and a BR containing syndiotactic-1,2-polybutadiene (SPB)), a styrene-butadiene rubber (SBR), a natural rubber (NR), an isoprene rubber (IR), a styrene-isoprene copolymer rubber, and a butadiene-isoprene copolymer rubber, more preferably include BR or SBR, and still more preferably include SBR.

The terminal-modified diene rubber may be a diene rubber having its polymer terminal modified with a modifier by any method known in the art. More specifically, the modifier may include a tin compound, an aminobenzophenone compound, an isocyanate compound, a diglycidyl amine compound, a cyclic imine compound, a halogenated alkoxysilane compound, a glycidoxypropylmethoxysilane compound, a neodymium compound, an alkoxysilane compound, a combination of an amine compound and the alkoxysilane compound.

There is no particular limitation on the silane coupling agent used for the kneading, as long as it contains sulfur in its molecule, and may be of any silane coupling agent mixed with silica in a rubber composition. Examples thereof include sulfide silanes such as bis(3-triethoxysilylpropyl)tetrasulfide (e.g., "Si69" by Degussa AG), bis(3-triethoxysilylpropyl)disulfide (e.g., "Si75" by Degussa AG), bis(2-triethoxysilylethyl)tetrasulfide, bis(4-triethoxy-silylbutyl)disulfide, bis(3-trimethoxysilylpropyl)tetrasulfide and bis(2-trimethoxysilylethyl)disulfide; mercaptosilanes such as γ-mercaptopropyltrimethoxysilane, γ-mercaptopropyltriethoxysilane, mercaptopropylmethyl-dimethoxysilane, mercaptopropyldimethylmethoxysilane and mercaptoethyltriethoxysilane; and blocked mercaptosilanes such as 3-octanoylthio-1-propyltriethoxysilane and 3-propionylthiopropyltrimethoxysilane. The silane coupling agent may preferably be added in the amount within a range from 2 to 25 parts by mass, and more preferably from 5 to 15 parts by mass, based on 100 parts by mass of silica.

As described above, the present apparatus can successfully be used for A-kneading step because the temperature inside the kneading chamber 5 is maintained for a given period of time, which enables kneading for an extended period of time within the temperature range suitable for the coupling reaction. This allows rubber products to be made with excellent properties. The following Examples provide detailed explanations on the specifics about the effects.

<B-kneading>

Figure 5:
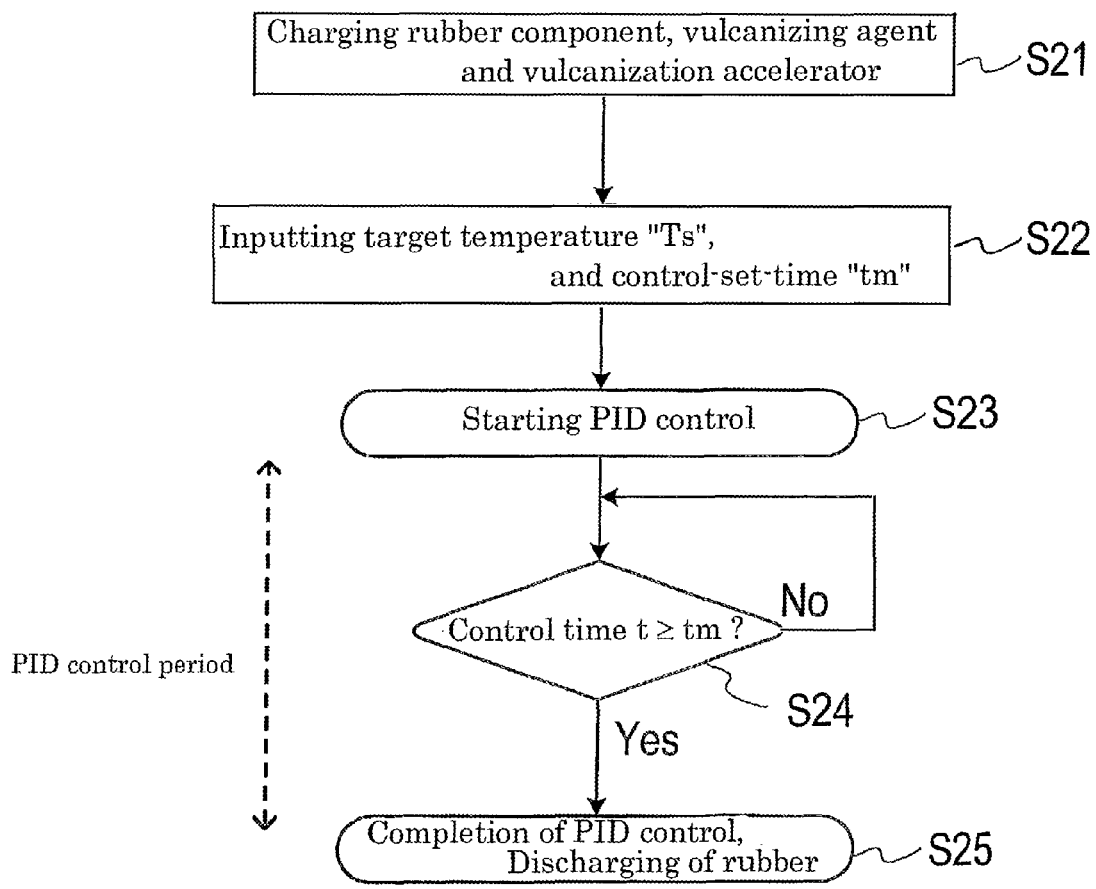
FIG. 5 is a flow chart showing a flow of the method for B-kneading conducted in the present apparatus.

Next, a description is made on B-kneading. FIG. 5 is a flow chart depicting the flow of a rubber processing method (B-kneading) conducted in the present apparatus 1. A rubber composition, vulcanizing agent and optional vulcanization accelerator are charged into the apparatus 1 (step S21); values are inputted for the target temperature "Ts" and for the control-set-time "tm" (step S22); and the control section 11 starts a PID control of the motor based on these values (step S23). In other words, a control signal from the control section 11 determines the rotational speed of the motor and thus determines the rotational speed (i.e., stirring speed) of the stirring rotor 6. Information regarding the target temperature "Ts" and control-set-time "tm" may be provided to the control section 11 in advance before the step S21.

It should be noted that the rubber composition, charged during the step S21 may be an A-kneaded rubber obtained by kneading a rubber component with a compounding agent which does not contain vulcanization components such as a vulcanizing agent and a vulcanization accelerator.

In addition, during the step S21, each of the rubber composition, vulcanizing agent and vulcanization accelerator may be charged separately into the apparatus 1 or a pre-stirred rubber composition containing a vulcanizing agent and vulcanization accelerator may be charged.

The control section 11 continues to control the rotational speed of the motor by the PID control until the control time "t" elapsed from the start of the control, reaches or exceeds the control-set-time "tm" ("No" in the step S24). As described previously, the specific control involves changing the rotational speed by a small amount based on the deviation from the target temperature "Ts" of the actual temperature "Tp" measured in the kneading chamber 5 by the temperature sensor 13, the integral value of the deviation, and the differential value of the deviation.

The target temperature "Ts" set in the step S22 may preferably be slightly lower than the lower limit temperature at which the rubber component initiates cross-linking. The reason is that, even though the control section 11 is configured for a PID control, the actual temperature may exceed the target temperature "Ts" slightly and temporarily during the control process. In other words, the target temperature "Ts" may preferably be set such that the actual temperature "Tp" in the kneading chamber 5 is allowed to exceed the target temperature "Ts" slightly and temporarily during the control process.

When the control time "t" reaches or exceeds the control-set-time "tm" ("Yes" in the step S24), the control section 11 completes the PID control of the motor, and the rubber mix composition is discharged from the drop door 7 (step S25).

The control-set-time "tm" set at the step S22 shall be longer than the time "tc" required for sufficiently dispersing the vulcanizing agent in the rubber composition.

It has been shown that, when B-kneading is conducted according to the flow chart depicted in FIG. 5, the rotational speed of the motor is changed by a small amount (upwardly or downwardly) as shown in FIG. 3, allowing the actual temperature "Tp" in the kneading chamber 5 to be maintained almost equal to the target temperature "Ts" over an extended period of time. By maintaining the temperature long enough, vulcanizing agent is dispersed sufficiently throughout the rubber composition in the kneading chamber 5. From a graph as shown in FIG. 3, it was confirmed that the PID control enabled the actual temperature "Tp" to be maintained within a range from 92° C. to 98° C. for the target temperature "Ts" of 95° C.

In the flow chart shown in FIG. 5, the control section 11 is configured to execute a PID control every time after the rubber composition and a vulcanizing agent are charged. In practice, the control section may be configured such that a user can choose whether or not to use the PID control.

In step S21, a rubber component, including materials similar to the one used for the aforementioned A-kneading step may be charged. Alternatively, an A-kneaded rubber in which the rubber component has been kneaded with a predetermined additive may be used. The predetermined additive is added as required and may include carbon black, silica, silane coupling agent, zinc oxide, stearic acid, anti-aging agent and softener such as wax and oil.

The vulcanizing agent to be charged may be a sulfur conventionally used for rubber and may include powder sulfur, precipitated sulfur, insoluble sulfur and high-dispersibility sulfur. In order to impart sufficiently high rubber-strength in the vulcanized rubber and to further improve the thermal resistance and durability, the sulfur content may preferably be within a range from 0.1 to 2.0 parts by mass, and more preferably from 0.1 to 1.0 part by mass, based on 100 parts by mass of the rubber component.

The vulcanization accelerator can be of any type used for rubber vulcanization and may include sulfenamide vulcanization accelerators, thiuram vulcanization accelerators, thiazole vulcanization accelerators, thiourea vulcanization accelerators, guanidine vulcanization accelerators, dithiocarbamate vulcanization accelerators and combinations thereof.

As described above, the present apparatus can successfully be used for the B-kneading step because the temperature inside the kneading chamber 5 is maintained for a given period of time, enabling sufficient dispersion of vulcanizing agent while preventing cross-linking. This enables the production of rubber products with excellent properties. The following Examples provide detailed explanations on the specifics about the effects.

EXAMPLES

First Example

Referring to Table 1, Example 1 is a result in which the present apparatus 1 was used for mastication with the PID control on, while Comparative Examples 1 and 2 show the results in which mastication was conducted with the PID control off. Each value is shown as a relative value against the reference value (100) of Comparative Example 1. The following materials were used.

(Material)
Natural rubber: RSS#3
Peptizer: A fatty acid zinc salt containing 5 to 10% by mass of DBD (2,2'-dibenzamidodiphenyldisulfide) (in which, the constituent fatty acid mainly consists of saturated fatty acid having 18 carbon atoms), "Aktiplast MS", manufactured by Rhein Chemie Rheinau GmbH.

In the case where the above materials are used, the lower limit temperature, at which the rubber components is scorched, is about 180° C., and stirring at this temperature of about 180° C. enables mechanical mastication to continue without causing the rubber to scorch. In particular, the temperature range may preferably be maintained at lower than 110° C., and more preferably lower than 100° C. In Example 1 below, the present apparatus 1 was used for stirring with its PID control on to maintain the temperature inside the kneading chamber 5 within the above described temperature range, at 90° C.

TABLE 1

| Conditions | Comparative Example 1 Peptizer added | Comparative Example 2 Peptizer increased | Example 1 Maintained at 90° C. |
|---|---|---|---|
| Natural rubber | 100 | 100 | 100 |
| Peptizer | 0.15 | 0.2 | 0 |
| Viscosity | 100 | 96 | 95 |
| TB | 100 | 93 | 112 |

Comparative Examples 1 and 2 are the cases where mechanical mastication was conducted before the addition of the peptizer, which was followed by chemical mastication as in the case of a conventional method. In Comparative Example 1, the addition amount of the peptizer is 0.15 based on 100 part of the natural rubber, and in Comparative Example 2 the addition amount was 0.2. Comparative Example 2 contains an increased amount of the peptizer.

The Example 1 is a case where the PID control by the apparatus 1 controlled the temperature such that the present mastication was conducted solely by mechanical mastication without the addition of a peptizer.

The following methods were used for the measurements, and each result was converted to a relative value against Comparative Example 1.

(Viscosity)
The masticated rubber discharged from the mixer was measured according to JIS K6300 for its Mooney viscosity ($ML_{1+4}$) using a Mooney viscometer having an L-shaped rotor under conditions including a preheat time of 1 minute, rotor revolution time of 4 minutes, temperature of 100° C. and rotational speed of 2 rpm. As the value of this parameter is smaller, it means that the formability becomes more excellent.

(Rubber strength (TB))

The tensile strength (TB (MPa)) was measured according to JIS K6251 on JIS No. 3 dumbbell samples. The TB value of Comparative Example 1 was regarded as 100, and the results for Example 1 and Comparative Example 2 were normalized to the 100 value. As the TB value is larger, it means that the rubber strength is higher and more favorable.

Comparing Example 1 with Comparative Example 1 in Table 1, Example 1 exhibits a lower viscosity, indicating its excellent formability. In addition, Example 1 exhibits a higher TB value, indicating its higher rubber strength.

Comparing Comparative Example 1 with Comparative Example 2, Comparative Example 2 has a smaller viscosity value, showing that an increased amount of peptizer has expectedly improved formability. However, Comparative Example 2 exhibits a TB value lower than that of Comparative Example 1, indicating its decreased rubber strength. This implies that an increased amount of peptizer, compared to Comparative Example 1, has promoted chemical reaction, causing molecules that are extremely short to be generated at many spots.

In Example 1, the mastication was conducted solely as mechanical mastication without a peptizer, which inhibits extremely short molecules from existing in the masticated rubber, avoiding the adverse effect of strength reduction by the peptizer. Moreover, the PID control of the present apparatus 1 permits the temperature to be kept in a temperature range around 90° C. for a predetermined period of time, enabling the production of masticated rubber with excellent formability even without chemical mastication.

Second Example

Referring to Table 2, Examples 2 to 4 are the cases where the present apparatus 1 was used for the A-kneading with the PID control on, while Comparative Examples 3 to 5 are the cases with the PID control off. Each value is expressed in a relative value against the reference value (100) of Comparative Example 3. The following materials were used for Examples and Comparative Examples.

(Materials)
  Modified styrene-butadiene rubber (modified SBR): HPR340 (modified S-SBR; amount of bonded styrene, 10% by mass; modified with amine and alkoxylsilane) manufactured by JSR Corporation
  Untreated silica: "NIPSIL AQ" available from Tosoh Silica Corporation
  Silane coupling agent: bis(3-triethoxysilylpropyl) disulfide, "Si-75" manufactured by Degussa AG
  Blocked mercaptosilane: a coupling agent represented by $(C_nH_{2n+1}O)_3Si-C_mH_2$, $-S-CO-C_kH_{2k+1}$ (n=2, m=3, k=7), "NXT" manufactured by MOMENTIVE PERFORMANCE MATERIALS INC.
  Oil: "Process X-140" available from Japan Energy Corporation For the above materials, the lower limit temperature at and above which the rubber component undergoes gelation is about 170° C., and the lower limit temperature at and above which the silica and a silane coupling agent undergoes a coupling reaction is about 130° C. In other words, holding within a temperature range higher than about 130° C. and lower than about 170° C. during stirring enables the rubber components to undergo a sufficient coupling reaction while preventing the formation of gel. The temperature range may preferably be maintained at higher than 140° C. and lower than 165° C. and, more preferably higher than 145° C. and lower than 160° C. In the following Examples 2 to 4, stirring was conducted in the kneading chamber 5 of the present apparatus 1, within the temperature range, at about 150° C., maintained with the PID control on.

TABLE 2

| | Comparative Example 3 | Comparative Example 4 | Comparative Example 5 | Example 2 | Example 3 | Example 4 |
|---|---|---|---|---|---|---|
| | | | Conditions | | | |
| | Discharged at 150° C. | Discharged at 160° C. | Discharged at 170° C. | Maintained at 150° C. for 1 minute | Maintained at 150° C. for 5 minutes | Maintained at 150° C. for 10 minutes |
| Viscosity | 100 | 97 | 105 | 92 | 87 | 82 |
| Payne effect | 100 | 81 | 78 | 71 | 50 | 44 |
| Rolling resistance | 100 | 100 | 99 | 101 | 98 | 95 |
| tan δ | 100 | 100 | 96 | 102 | 94 | 85 |

The following methods were used for the measurements, and each result was converted to a relative value against Comparative Example 3.

(Viscosity)

The rubber mix composition discharged from the mixer was measured, according to JIS K6300, for its Mooney viscosity ($ML_{1+4}$) using a Mooney viscometer having an L-shaped rotor under the conditions of preheat time of 1 minute, rotor revolution time of 4 minutes, temperature of 100° C., and rotational speed of 2 rpm. As the value of this parameter is smaller, it means that the formability becomes more excellent.

(Payne Effect)

A portion of each rubber mix composition, discharged from the mixer, was taken to prepare a test piece, and a rubber process analyzer was used to obtain the Payne-effect value determined by subtracting the minimum shear force from the maximum shear force, in which the shear forces were measured while changing the strain from 0.5% to 45%. As described above, each value is expressed in a relative value against the reference value of Comparative Example 3. As the Payne effect is smaller, it means that the dispersibility of silica becomes more excellent.

(Rolling Resistance)

The rubber mix composition was discharged from the mixer and was vulcanized at 150° C. for 30 minutes to produce a tread rubber which is used for preparing a test tire for evaluating rolling resistance. The rolling resistance test was conducted according to JIS D4234. The drum diameter was 1,708 mm, the ambient temperature was 25° C., testing mode was the Force technique, and each result was obtained as a relative value with reference to the tire of Comparative Example 3 set at 100. As the value is smaller, it means that the rolling resistance is lower, and thus the fuel economy becomes more excellent.

(Tan δ)

The rubber mix composition discharged from the mixer was vulcanized at 150° C. for 30 minutes to prepare a test piece with a predetermined shape, and a viscoelastic spectrometer, manufactured by UBM Ltd., was used for measuring tan δ according to JIS K6394 with the initial strain of 15%, kinetic strain of ±2.5%, frequency of 10 Hz, and temperature of 60° C. Each result is indicated as a relative value against the reference value, 100, for Comparative Example 3. As the value is smaller, it means that the amount of heat generation becomes lower.

Table 2 shows that Examples 2 to 4 exhibit low viscosities and Payne effect values compared with Comparative Examples 3 to 5, indicating their excellent formability and dispersibility of silica. A longer holding time reduces the rolling resistance and the value for tan δ, which indicates the low fuel consumption and low heat generation.

The Comparative Examples 3 to 5 show that as the temperature inside the kneading chamber is higher, the Payne effect value becomes lower, and the dispersibility of silica is increased. The rolling resistance and tan δ, however, are not significantly affected by the rise of temperature. Moreover, the increased viscosity implies that the silica was re-aggregated. In contrast, Examples 2 to 4 show that a prolonged holding time decreases all of the values for viscosity, rolling resistance and tan δ.

Third Example

Referring to Table 3, Example 5 is the case where the present apparatus 1 was used with its PID control on for the B-kneading, and Comparative Examples 6 and 7 are the cases where the present apparatus 1 was used with its PID control off for the B-kneading.

In the case of Comparative Example 6, kneading was conducted with the PID control off and was completed as soon as the temperature inside the kneading chamber 5 reached 110° C. The kneading time at the time of completion was 60 seconds.

In the case of Comparative Example 7, kneading was conducted with PID control off and was completed as soon as the temperature inside the kneading chamber 5 reached 125° C. The kneading time at the time of completion was 120 seconds.

In the case of Example 5, kneading was conducted in the present apparatus 1 with the PID control on, which maintained the temperature in the kneading chamber 5 at 110° C., and the kneading was completed as soon as the kneading time reached 120 seconds as in the case of Comparative Example 7.

In Table 3, the values for the vulcanization speed and scorch time are shown in relative values against the reference value (100) of Comparative Example 6. For each Example and Comparative Example, an A-kneaded rubber, obtained by kneading the following materials, was further kneaded with a vulcanizing agent and vulcanization accelerator.

(A-Kneaded Rubber Material)
Modified styrene-butadiene rubber (modified SBR): HPR340 (modified S-SBR; amount of bonded styrene, 10% by mass; modified with amine and alkoxylsilane), manufactured by JSR Corporation Untreated silica: "NIPSIL AQ" available from Tosoh Silica Corporation Silane coupling agent: bis(3-triethoxysilylpropyl) disulfide, "Si-75" manufactured by Degussa AG Blocked mercaptosilane: coupling agent represented by $(C_nH_{2n+1}O)_3Si-C_mH_{2m}-S-CO-C_kH_{2k+1}$ (n=2, m=3, k=7), "NXT" manufactured by MOMENTIVE PERFORMANCE MATERIALS INC.

Oil: "Process X-140" available from Japan Energy Corporation (Vulcanizing Agent)
"5% oil treated sulfur" manufactured by Hosoi Chemical Industry Co., Ltd (Vulcanization Accelerator)
N-Cyclohexyl-2-benzothiazolyl-sulfenamide, "NOCCELER CZ-G (CZ)", manufactured by Ouchi Shinko Chemical Industry CO., Ltd.

When the above materials are used, the lower limit temperature at which the rubber component initiates cross-linking is about 120° C. Preferably, a temperature range of about lower than 120° C., and more preferably 110° C. or lower, may be maintained during the stirring to prevent the rubber component from crosslinking and to sufficiently disperse the vulcanizing agent and vulcanization accelerator. As described previously, the stirring for Example 2 was conducted in the present apparatus 1 with the PID control on, such that the temperature inside the kneading chamber 5 is maintained within the above described range, at 110° C.

TABLE 3

| Conditions | Comparative Example 6 Discharged at 110° C. | Comparative Example 7 Discharged at 125° C. | Example 5 Maintained at 110° C. |
|---|---|---|---|
| Kneading time (sec.) | 60 | 120 | 120 |
| Vulcanization speed | 100 | 105 | 95 |
| Scorch time | 100 | 45 | 102 |

The following methods were used for the measurements, and each result was converted to a relative value against Comparative Example 6.

(Vulcanization Speed)

The rubber mix composition discharged from the mixer was subjected to a vulcanization test at 160° C. for 60 minutes using a rheometer, in which the control time was measured from the beginning of the measurement until the difference between the maximum value, $M_H$, and minimum value, $M_L$ of the torque (i.e., $M_H$-$M_L$) becomes 50%. As the value is lower, it is indicated that the time required for the vulcanization becomes shorter, and the dispersion of the vulcanizing agents is favorable.

(Scorch time)

The rubber mix composition discharged from the mixer was measured of its scorch time (Sco (t5)) at 125° C., according to JIS-K 6300-1. As the value is greater, it is indicated that the rubber mix composition is less vulcanized at the time of the discharging from the mixer.

The Comparative Example 7 exhibits a value of scorch time significantly lower than that of Comparative Example 6. This indicates that, in the case of Comparative Example 7, the temperature inside the kneading chamber 5 at the time of discharging was higher than that for Comparative Example 6 and, as a result, the vulcanization during the kneading was more progressed in Comparative Example 7. As for the vulcanization speed, Comparative Example 7 exhibits a higher value compared with Comparative Example 6, indicating that the increased temperature has reduced the dispersibility of vulcanizing agents.

Comparing Example 5 with Comparative Example 6, Example 5 exhibits a smaller value for the vulcanization speed. Unlike Comparative Example 6 in which the stirring was completed as soon as the temperature reached 110° C., Example 5 in which the PID control maintained the temperature to about 110° C. during the stirring for a predetermined period of time allowed an stirring for a longer period of time compared with Comparative Example 6, permitting the vulcanizing agent to be more dispersed.

Comparing Example 5 with Comparative Example 7, Comparative Example 7 exhibits a significantly smaller value for the scorch time. Comparing Example 5 with Comparative Example 6, the difference in the scorch time is almost not changed. This demonstrates that the method according to Example 5 enables kneading for an extended period of time without promoting vulcanization.

As described above, Example 5 according to the method of the present invention allows the kneading temperature to be maintained at a temperature lower than the lower limit temperature at which cross-linking occurs, for a predetermined period of time, thereby improves the dispersion of the vulcanizing agent while preventing cross-linking.

What is claimed is:

1. A method for processing a rubber, comprising:
   a mastication stage comprising the steps of;
      allowing a material to exist in a kneading chamber equipped with a stirring rotor whose rotational speed being automatically controllable by a control section, the kneading chamber being enclosed and capable of measuring and outputting an interior temperature, and the material containing a rubber component; and
      setting a control time and a target temperature on the control section wherein the target temperature is set to a temperature lower than 100° C.:
   a first kneading stage comprising the steps of;
      allowing the rubber component to exist in the kneading chamber;
      setting a control time and a target temperature on the control section; and
      maintaining the rubber component at the actual temperature almost equal to the target temperature over an extended period of time: and
   a second kneading stage comprising the steps of;
      adding a vulcanizing agent to the rubber component in the kneading chamber; and
      setting a control time and a target temperature on the control section:
   wherein stirring inside the kneading chamber while automatically controlling the rotational speed by a PID control configured to attempt to match the actual temperature with the target temperature until expiration of a control time being set, based on the information regarding the actual temperature and information regarding a target temperature being set, during and after completion of each stage.

2. The method for processing a rubber according to claim 1, wherein the material contains a natural rubber or a rubber mixture containing 50% or more of a natural rubber.

3. The method for processing a rubber according to claim 2, wherein during the mastication stage the target temperature is set to a temperature lower than a lower limit temperature at and above with the natural rubber is scorched.

4. The method for processing a rubber according to claim 1, wherein the material contains a rubber component, silica and a silane coupling agent.

5. The method for processing a rubber according to claim 4, wherein during the first kneading stage the target temperature is lower than a lower limit temperature at which the rubber component undergoes gelation, and higher than a lower limit temperature at which a coupling reaction of silica with a silane coupling agent occurs.

6. The method for processing a rubber according to claim 5, wherein the rubber component contains a modified styrene-butadiene rubber modified with an amine and an alkoxysilane, and the silane coupling agent contains bis(3-triethoxysilylpropyl)disulfide or a blocked mercaptosilane.

7. The method for processing a rubber according to claim 4, wherein during the first kneading stage the rubber component is maintained at the actual temperature almost equal to the target temperature over an extended period of time to permit a sufficient coupling reaction of the silane coupling agent in the kneading chamber.

8. The method for processing a rubber according to claim 1, wherein during the second kneading stage the target temperature is a temperature lower than a lower limit temperature at which the rubber component initiates cross-linking.

9. The method for processing a rubber according to claim 8, wherein the target temperature is a temperature lower than 120° C.

10. The method for processing a rubber according to claim 9, wherein the target temperature is a temperature lower than 110° C.

* * * * *